Feb. 27, 1940.   E. F. ZAP   2,191,839
FLAP-TRAILED AIRFOIL
Filed Dec. 22, 1937
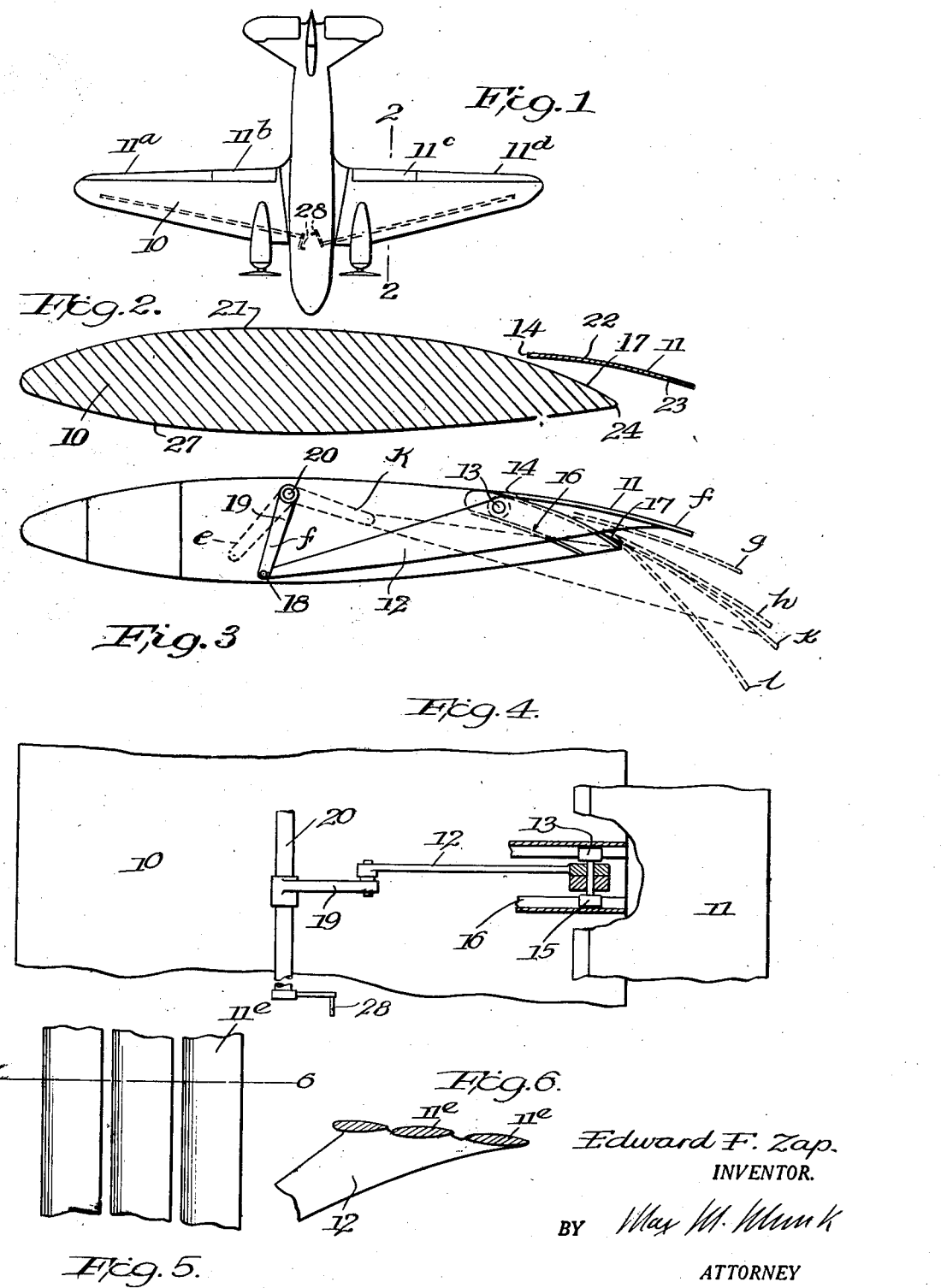
Edward F. Zap.
INVENTOR.
ATTORNEY Patented Feb. 27, 1940

2,191,839

UNITED STATES PATENT OFFICE 2,191,839

FLAP-TRAILED AIRFOIL

Edward F. Zap, West Chester, Pa.

Application December 22, 1937, Serial No. 181,214

6 Claims. (Cl. 244—42)

This invention relates to an airfoil which is trailed by one or several displaceable flaps. It is an object of the invention to provide for such flap-trailed airfoil which can be modified to give a particularly small drag, suitable for cruising and high speed, to give the combination of a small drag and high lift capacity, suitable for take-off and climb, and to give the combination of large drag and high lift, suitable for landing. It is a further object of this invention to provide for such airfoil having a small travel of the center of pressure. It is a further object of the invention to provide for such airfoil suitable for use as lateral control, as ordinarily obtained by the ailerons. It is a further object to provide for such airfoil having a simple, sturdy, reliable, and light control mechanism. It is a further object to provide for such airfoil requiring small control forces and displacement forces.

All these objects are obtained by combining a double-cambered stationary airfoil with a thin sheet-shaped flap in rearward and upward relation thereto. The flap is in close contact along its leading edge with the upper airfoil surface, and inclined thereto so as to form an open pocket therewith. Said leading edge is shifted along said surface, which shifting motion is combined with a suitable rotation of the flap. In the preferred embodiment of the invention, this displacement motion is produced by a simple lever gear as described in the specification.

These and other desirable objects and advantages of the present invention will be illustrated in the accompanying drawing and described in the specification, certain preferred embodiments being disposed by way of illustration only, for, since the underlying principles may be incorporated in other specific devices, it is not intended to be limited to the ones here shown, except as such limitations are clearly imposed by the appended claims.

In the drawing, like numerals refer to similar parts throughout the several views, of which Fig. 1 represents the top view of an airplane embodying my invention, Fig. 2 represents the airfoil and flap contour taken on line 2—2 of Fig. 1, Fig. 3 represents the cross section corresponding to the contour of Fig. 2, showing the flap structure and displacement mechanism inside the airfoil, Fig. 4 represents a sectional top view of a portion of the airfoil, showing the mechanism of Fig. 3 as seen from above, Fig. 5 is a top view of a variation of the flap shown in Figs. 2 to 4, and Fig. 6 is a cross section through the flap of Fig. 5 on the line 6—6.

In Fig. 1 there are shown in combination with a conventional airplane a stationary airfoil 10 having attached thereto along its trailing edge displaceable flaps 11a, 11b, 11c, and 11d. Fig. 2 shows any one of these flaps in their most forward position. Fig. 3 shows the same position 10 of the flap in full line, and several other positions, designated by $f$, $j$, $h$, $k$, and $l$, drawn in dashed line. In the position $f$ of the flap, the upper camber 22 of flap 11 forms a smooth and substantially unbroken continuation of the forward portion 21 of the upper camber line of airfoil 10, the leading edge 14 of the flap being in intimate contact with said upper camber line. The lower camber 23 of the flap contour forms a pocket together with the rear portion 17 of the upper camber line of the airfoil 10, open downwardly and rearwardly. In the rear positions $k$ and $l$ of the flap, its leading edge 14 is adjacent the trailing edge 24 of the airfoil. In the position $k$, the upper camber of the airfoil and that of the flap are still in approximately continuous alignment with each other, but in the position $l$, there is a break or pronounced angle between flap and airfoil at the trailing edge 24. The lower camber line 27 of the airfoil is downwardly convex, making the wing section contour double-cambered.

Flap 11 is provided with a plurality of flap levers 12 rigidly fastened thereto, which levers extend substantially chordwise into the inside of the airfoil 10. Pins 13 of levers 12, adjacent the leading flap edge 14, surrounded by ball bearings 15, are guided by pairs of guide rails 16 fastened to the structure of airfoil 10, and extending adjacent and parallel to the rear camber portion 17 of its upper surface. The front end 18 of the flap levers 12 is hinged to the lower ends of the depending control levers 19 shown in three positions in Fig. 3, one in solid line corresponding to the position $f$ of the flap, and two in dashed line, marked $e$ and $k$. Said control levers 19 are mounted on control shafts 20 supported by airfoil 10 and extending therewithin in a substantially spanwise direction. Shafts 20 are in operative connection with the cockpit control in any conventional manner not shown, mechanical, electrical, or hydraulic, manually or power driven under the control of the pilot, as schematically indicated by crank 28 mounted on shaft 20. The control shafts 20 serving flaps 11a and 11d can be rotated in the same sense and/or in opposite sense of rotation, whereby the flaps 11a and 11d serve for lift and drag variation of the airfoil as well as to provide the usual aileron action.

The position f of the flap is intended for cruising and fast flying. An even more forward position corresponds to lever position e, whereby the trailing edge of the flap is depressed relative to its position f. This position occurs during the aileron use of the flaps while cruising or flying fast. For take-off, the lever 19 is turned towards position k, whereby the flaps move rearwardly from the initial position f, and the trailing edge is depressed. For landing, the shaft 20 is turned from f beyond position k of the control lever 19. During this last portion of the turn, that is from position h or k into position l, the leading flap edge 14 remains almost stationary, and is hardly shifted at all. The flap motion is then almost exclusively restricted to a rotation about the trailing edge of the airfoil, whereby an angle is formed between airfoil and flap having its apex at 24 and concave to the bottom, and a strong braking action is produced.

The flap 11 in Figs. 1 to 4 is integral, or of one piece. In some cases, where a particularly large increase of the lift capacity is desirable, it is advisable to slot flap 11, or to replace it by a combination of span-wise arranged flap strips in parallel and spaced relation. All strips are rigidly fastened to flap levers 12. These flap strips may be made of a single layer metal sheet, or, preferably, they may be streamlined by giving them sharp trailing edges and a slightly thicker mid portion as shown in Fig. 6. They are so mutually arranged as to facilitate a flow of the air through the slots in upward and rearward direction.

I claim:

1. In an airplane, the combination of a thick stationary airfoil and a thin displaceable flap in upward and rearward relation thereto forming an angle with the rear portion of the upper surface of said airfoil, the leading edge of the flap being in substantially spanwise direction and movable substantially chordwise in intimate sliding contact with said surface.

2. In an airplane, the combination of a double-cambered stationary airfoil and a thin displaceable flap in upward and rearward relation thereto forming an angle with the rear portion of the upper surface of said airfoil, the leading edge of the flap being in substantially spanwise direction and movable substantially chordwise in intimate sliding contact with said surface.

3. In an airplane, the combination of a thick stationary airfoil and a thin, slotted, displaceable flap in upward and rearward relation thereto forming an angle with the rear portion of the upper surface of said airfoil, the leading edge of the flap being in substantially spanwise direction and movable substantially chordwise in intimate sliding contact with said surface.

4. In an airplane, the combination of a thick stationary airfoil, a thin displaceable flap in upward and rearward relation thereto forming an acute angle with the rear portion of the upper surface of said airfoil, the leading edge of the flap being substantially in spanwise direction and in sliding contact with said surface, and means for sliding the leading edge of the flap in a substantially chordwise direction along the rear portion of the upper surface of the airfoil, so constructed and arranged that an approach of said leading edge towards the trailing edge of the airfoil is associated with a turning of the flap into an increasingly steeper backward and downward angle.

5. In an airplane, a double cambered wing and a thin rearwardly projecting flap, the upper surface of said flap being substantially tangential to the upper surface of said wing at all points of contact of said surfaces, and the trailing edge of said flap terminating substantially in the projected wing lower camber curve at any chordwise section through the wing flap combination.

6. An airplane comprising an airfoil, a pair of substantially spanwise extending flaps mounted on top of the rear portion of each side of the airfoil forming a rearwardly and downwardly open pocket therewith, and control means for shifting said flaps in substantially chordwise but opposite directions while maintaining an intimate gliding contact between the leading edge of the flaps and the upper surface of the airfoil.

EDWARD F. ZAP.